US008818778B2

(12) United States Patent
Salazar-Tio et al.

(10) Patent No.: US 8,818,778 B2
(45) Date of Patent: Aug. 26, 2014

(54) METHOD FOR CREATING A 3D ROCK REPRESENTATION USING PETROPHYSICAL DATA

(75) Inventors: Rafael Salazar-Tio, San Ramon, CA (US); Boqin Sun, Concord, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 615 days.

(21) Appl. No.: 12/561,083

(22) Filed: Sep. 16, 2009

(65) Prior Publication Data

US 2011/0066404 A1 Mar. 17, 2011

(51) Int. Cl.
*G06G 7/48* (2006.01)
*G01V 11/00* (2006.01)

(52) U.S. Cl.
CPC ....................................... *G01V 11/00* (2013.01)
USPC .................................................. 703/10; 703/9

(58) Field of Classification Search
None
See application file for complete search history.

(56) References Cited

U.S. PATENT DOCUMENTS

| | | | |
|---|---|---|---|
| 6,140,050 A | 10/2000 | Sahin et al. | |
| 6,338,947 B1 | 1/2002 | Sahin et al. | |
| 6,388,947 B1 * | 5/2002 | Washbourne et al. | 367/73 |
| 6,886,632 B2 * | 5/2005 | Raghuraman et al. | 166/252.4 |
| 7,840,394 B2 * | 11/2010 | Madatov et al. | 703/10 |
| 2008/0120034 A1 | 5/2008 | Georgi et al. | |
| 2008/0221800 A1 | 9/2008 | Gladkikh et al. | |
| 2009/0119076 A1 | 5/2009 | Madatov et al. | |
| 2009/0187391 A1 * | 7/2009 | Wendt et al. | 703/7 |

FOREIGN PATENT DOCUMENTS

| | | |
|---|---|---|
| WO | WO 94-03868 A1 | 2/1994 |
| WO | WO 03-107253 A1 | 12/2003 |

OTHER PUBLICATIONS

Alpak et al. "Joint Inversion of Pressure and Time-Lapse Electromagnetic Logging Measurements", 2003, SPWLA 44th Annual Logging Symposium, 14 pages.*
Moro et al. "Joint inversion of surface wave dispersion curves and reflection travel times via multi-objective evolutionary algorithms", Jan. 2007, Journal of Applied Geophysics, vol. 61, Issue 1, pp. 56-81.*
Salazar et al., Application of the Bethe-Peierls approximation to a lattice-gs model of adsorption on mesoporous materials, Physical Review E, 2005, pp. 011502-1-041502-9, vol. 71, The American Physical Society.
Bergman et al., Self-diffusion in a periodic porous medium: A comparison of different approaches, Physical Review E, Apr. 1995, pp. 3393-3400, vol. 51 No. 4, The Ameican Physical Society.
Salazar et al., A Computational Study of the Reconstruction of Amorphous mesoporous Materials from Gas Adsorption Isotherms and Structure Factors via Evolutionary Optimization, Langmuir, 2007, pp. 530-541, vol. 23, No. 2, ACS Publications, Washington.
Chen et al., Determination of grain size distribution from NMR relaxation time using pore scale modeling SCA2007-49.

(Continued)

*Primary Examiner* — Suzanne Lo
(74) *Attorney, Agent, or Firm* — Albert K. Shung

(57) ABSTRACT

The present invention enables the use of a global optimization method for performing joint-inversion of multiple petrophysical data sets, using forward models based on first principle of physics, to generate a 3D rock representation of a subsurface rock structure. The resulting 3D rock representation captures the internal structure, and honors the measured petrophysical properties, of the subsurface rock structure. The 3D rock representation can then be used to predict additional properties not considered in the inversion, to further characterize the subsurface rock structure.

12 Claims, 5 Drawing Sheets

(56) References Cited

OTHER PUBLICATIONS

Gladkikh et al., Pore geometric modeling for petrophysical interpretation of downhole formation evaluation data, Water Resources Research, 2007, pp. 1-12, vol. 43, W12508, American Geophysical Union.

Stollnitz et al., Wavelets for Computer Graphics: A Primer, Part 1, Tutorial, May 1995, pp. 76-84, IEEE.

* cited by examiner

METHOD FOR CREATING A 3D ROCK REPRESENTATION USING PETROPHYSICAL DATA

TECHNICAL FIELD

The present invention relates generally to methods and systems for creating a 3D rock representation of a subsurface rock structure, and specifically to global optimization methods which utilize joint-inversion of petrophysical data as input data for the method.

BACKGROUND OF THE INVENTION

Traditional methods of joint-inversion for log and core data use fractions of different minerals and fluids to represent subsurface rock structures. In most cases, the petrophysical properties of the composite are modeled as averages of the properties for individual components weighted by the corresponding fraction. Most models are linear, some are nonlinear, but all models are analytical approximations to a full solution given by the first principles of physics. There are widely-used methods for joint-inversion analysis that apply to these models and give precise descriptions of the volumetric ratio of mineral and fluid in a rock formation. Such analysis lacks any description relative to the internal rock structure and pore network. Therefore, while the methods have the advantage of being fast due to the availability of efficient matrix inversion methods, they cannot provide critical reservoir parameters such as pore connectivity, tortuosity, elastic properties, capillary pressure, permeabilities, faci, and relative permeability. Furthermore, these analysis methods often use local optimization algorithms, producing different solutions for different initial estimates.

A complete solution using first physical principles in forward models for petrophysical properties, such as NMR properties, electrical properties, elastic properties, nuclear properties, capillary pressure and permeabilities, and others require, in general, additional information about the internal rock structure including the connectivity of the rock pore space or solid frame in addition to the fractional description. There is a need for an inversion method that captures the internal rock structure in addition to the volumetric fractions, and generates a 3D representation of a subsurface rock, which can be used to calculate other petrophysical properties and reservoir parameters, not considered in the original inversion, giving a predictive capability to the method.

SUMMARY OF THE INVENTION

Described herein are implementations of various embodiments for creating a 3D rock representation of a subsurface rock structure using petrophysical data.

According to one implementation of the present invention, a computer implemented method for creating a 3D rock representation of a subsurface rock structure using petrophysical data is provided. The method generally includes storing a plurality of acquired data sets related to a subsurface rock structure, wherein the datasets comprise measured petrophysical properties of the subsurface rock structure, in a computer storage media. The method further includes executing, on a computer system comprising one or more processors configured to communicate with the computer storage media and execute one or more computer programs configured to generate a simplified 3D rock representation of the subsurface rock structure with a reduced number of variables, wherein the variables represent an approximation to the rock structure. The method additionally includes generating, by the computer system, a 3D rock representation from the simplified 3D rock representation. The method also includes forward modeling, by the computer system, a plurality of petrophysical properties on the 3D rock representation to generate predicted petrophysical properties, and comparing, by the computer system, the predicted petrophysical properties and the measured petrophysical properties. The method includes modifying, by the computer system, the variables of the simplified 3D rock representation using a global optimization method and repeating certain operations above until convergence of the predicted petrophysical properties and the measured petrophysical properties is reached. The method also includes generating, by the computer system, an optimized 3D structural representation from the simplified 3D rock representation found at convergence; wherein the optimized 3D rock representation has the petrophysical properties of the subsurface rock structure and can be used to simulate additional petrophysical, geology and reservoir properties.

In some embodiments, the data sets include core data and log data; the petrophysical properties include rock and fluid properties, including NMR properties, electrical properties, elastic properties, nuclear properties, capillary pressure and permeabilities; and the simplified 3D rock representation comprises one or more of a discrete Fourier filtered representation in lineal or logarithmic scale, a wavelet filtered representation, a transition probability 3D matrix representation, and a sedimentary model representation.

In additional embodiments, the forward modeling method comprises joint-inversion of any combination of NMR response, electric properties, elastic response, nuclear properties, capillary pressure, formation factor, and permeabilities; the forward modeling method comprises nonlinear joint-inversion; the forward modeling method comprises one or more of random walks, finite differences, finite elements, network modeling, and cellular automata; and convergence is determined when the difference between the measured petrophysical properties and the predicted petrophysical properties are minimized in accordance with equation:

$$\chi^2(x) = \sum_{j=1}^{N_j} [b_j - f_j(x)]^2$$

In yet other embodiments of the present invention, modifying the variables of the simplified 3D rock representation utilizes a global optimization method which comprise one or more of evolutionary strategies, genetic algorithms, simulated annealing, and parallel tempering; the evolutionary strategies includes recombination, mutation, and selection of individuals in a population of solutions; the optimized 3D rock representation is used to predict additional petrophysical, geological and reservoir properties, including: NMR properties, electrical properties, elastic properties, nuclear properties, capillary pressure and permeabilities, facies, and relative permeability; and the optimized 3D structural representation is graphically displayed.

According to another implementation of the present invention, a computer system configured to perform joint-inversion of petrophysical data sets to obtain a 3D rock representation of a subsurface rock structure is provided. The computer system generally includes: a computer storage device having computer readable media including a plurality of data sets related to a subsurface rock structure, wherein the datasets comprise measured petrophysical properties of a subsurface rock structure; a graphical user interface comprising a user input device and a display device, configured and arranged to display at least one image of an optimized 3D rock representation; and at least one processor, configured and arranged to execute computer-readable executable instructions stored in computer storage media. When executed, a user is enabled to perform operations that include: generating a simplified 3D rock representation of the subsurface rock structure with a reduced number of variables, wherein the variables represent an approximation to the rock structure; generating a 3D rock representation from the simplified rock representation; forward modeling a plurality of petrophysical properties on the 3D rock representation to generate predicted petrophysical properties; comparing the predicted petrophysical properties to the measured petrophysical properties; modifying the variables of the simplified 3D rock representation using a global optimization method and repeating certain operations above until convergence of the predicted petrophysical properties and the measured petrophysical properties is reached; generating an optimized 3D rock representation from the simplified 3D rock representation found at convergence; wherein the optimized 3D rock representation has the petrophysical properties of the subsurface rock structure and can be used to determine additional characteristics of the subsurface rock structure.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

The present invention enables the use of a global optimization method for performing joint-inversion of multiple petrophysical data sets, using pore-scale forward models, to generate a 3D rock representation of a subsurface rock structure. The resulting 3D rock representation captures the internal structure, and honors the measured petrophysical properties, of the subsurface rock structure. The 3D rock representation can then be used to predict additional properties not considered in the inversion to further characterize the subsurface rock structure.

Figure 1:
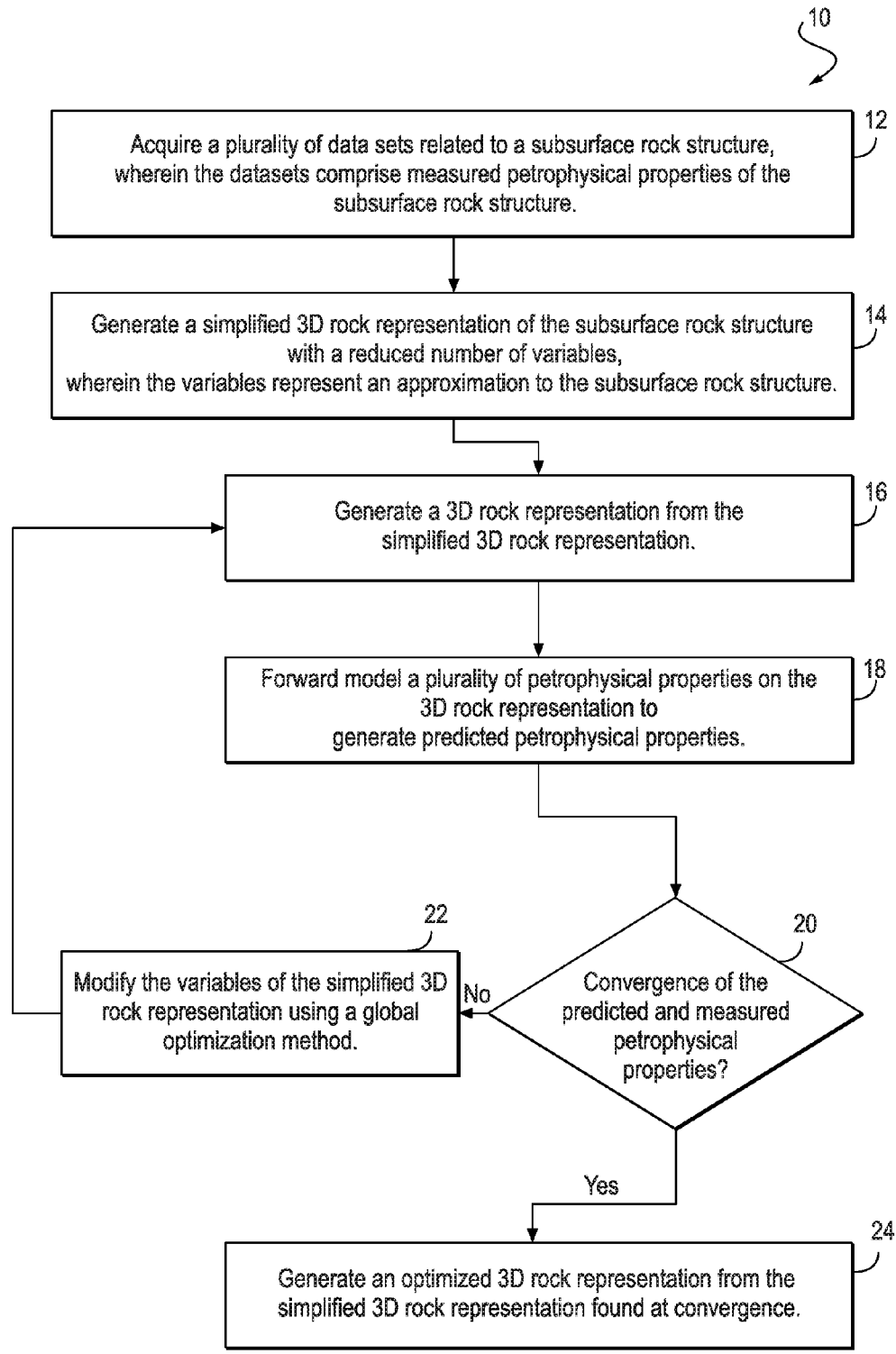
FIG. 1 illustrates a flowchart of one embodiment of the present invention.

FIG. 1 illustrates a flowchart of one embodiment of the present invention for a computer-implemented joint-inversion method for creating a 3D rock representation of a subsurface rock structure using petrophysical data 10. The method includes acquiring a plurality of data sets related to a subsurface rock structure, wherein the datasets comprise measured petrophysical properties of the subsurface rock structure 12; generating a simplified 3D rock representation of the subsurface rock structure with a reduced number of variables, wherein the variables represent an approximation to the subsurface rock structure 14; generating a 3D rock representation from the simplified 3D rock representation 16; forward modeling a plurality of petrophysical properties on the 3D rock representation to generate predicted petrophysical properties 18; determine convergence of the predicted and measured petrophysical properties 20; modifying the variables of the simplified 3D rock representation using a global optimization method and repeating operations 16 to 22 until convergence of the predicted petrophysical properties and the measured petrophysical properties is reached 22; and generating an optimized 3D rock representation from the simplified 3D rock representation found at convergence 24.

Acquiring Data Sets Related to a Subsurface Rock Structure.

At operation 12 a plurality of data sets related to a subsurface rock structure are acquired. The data sets comprise measured petrophysical properties of the subsurface rock structure, and can include core data and well log data. Those skilled in the art will recognize that other data sets comprising measured petrophysical properties of the subsurface rock structure may be used. Petrophysical properties which reflect the structure of the rock pore space or solid frame, and fluid properties, can include for example: NMR properties, electrical properties, elastic properties, nuclear properties, capillary pressure and permeabilities. In some embodiments, NMR time evolution of magnetization, NMR $T_2$ decay, and the formation factor are petrophysical properties used to generate a simplified 3D rock representation of the subsurface rock structure. The NMR $T_2$ decay indirectly measures the pore size since the signal decay from protons is accelerated when spins hit a grain surface while diffusing in the fluid. Therefore, NMR $T_2$ decay contains information relative to small scale features. The formation factor is a measure of the tortuosity or interconnectivity between pores and therefore carries information about larger scale features. These two petrophysical properties are complementary for the reconstruction of a 3D rock representation which includes both scales.

Generating a Simplified 3D Rock Representation.

Figure 2:
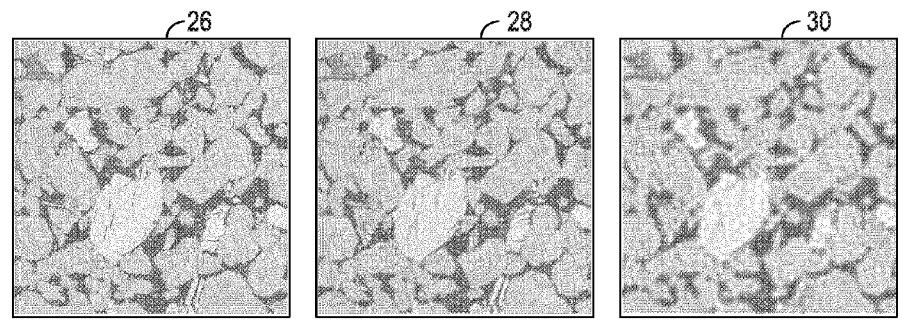
FIG. 2 illustrates a comparison of images of one embodiment of the present invention.

At operation 14, a simplified 3D rock representation of the subsurface rock formation is generated with a reduced number of variables, wherein the variables represent an approximation to the subsurface rock formation. In some embodiments, the simplified structural representation is generated using one or more of a discrete Fourier filtered representation in lineal or logarithmic scale, a wavelet filtered representation with different wavelet types, a transition probability 3D matrix with spatial correlations, and a sedimentary model built using a distribution of grain sizes and shapes. FIG. 2 shows the comparison between an original image or slice of the 3D rock image 26 and the slice of reconstructed images from the simplified 3D rock representations using the same size for a vector x for both a logarithmic scaled discrete Fourier representation ("LDF") 28, and a Fourier high-filtered representation 30, which discards small wavelengths. The goal of generating the simplified representation is to reduce the number of effective variables and to avoid filtering out small wavelengths which have an important effect on pore-solid surface properties.

Figure 3:
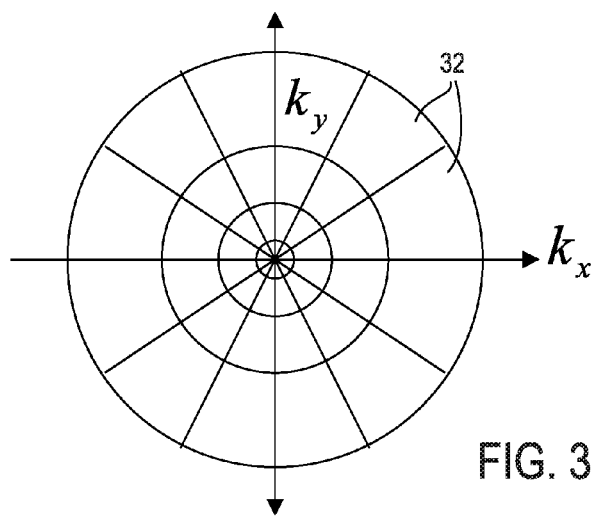
FIG. 3 illustrates representation domains in 2D of one embodiment of the present invention.

Referring to FIG. 3, 2D visualization LDF representation domains 32 are shown in accordance with embodiments of the invention. Instead of considering all the Fourier components on a 3D grid, the Fourier space is subdivided into regions which span certain given solid angle apertures. In 3D embodiments, this is similar to the latitude and longitude divisions of the earth's surface. Along the radial direction, a logarithmic scale sub-division is used to span different orders of scale equally.

As an example not intended to be limiting, to generate a simplified representation, let $\phi(r)$ be the image in the 3D discrete real space or lattice of size $N_L = L_x \cdot L_y \cdot L_z$. A discrete Fourier transform produces a complex function $\hat{\phi}(k)$ in the 3D discrete Fourier space or lattice. In order for $\phi(r)$ to be definite, the Fourier transform $\hat{\phi}(k)$ satisfies $\hat{\phi}(-k) = \hat{\phi}^*(k)$ (the star designates complex conjugate), so there will still be $N_L$ independently varying quantities in the representation. The inverse Fourier transform of $\hat{\phi}(k)$ yields the image $\phi(r)$. A segmentation between different phases (pore, grains, and clays) can be performed on this image. For example, a binary (pore and solid) segmentation is recovered via a level cut $\Theta(\phi(r) - \phi_c)$ where $\Theta$ is the Heaviside step function and the cutoff value $\phi_c$ is determined by the porosity of the material, assumed to be known. The simplified representation X is constructed considering the independent real and imaginary parts of the representative values of $\hat{\phi}(k)$ in the discrete domains shown as 32 in FIG. 3.

Generating a 3D Rock Representation.

Referring back to FIG. 1, at operation 16 a 3D rock representation is generated from the simplified 3D rock representation. In some embodiments of the present invention, the 3D rock representation is generated from the simplified 3D rock representation X utilizing the following operations:

1. Assign the values of real variables $x_i$ to designated real or imaginary parts of the domain representative complex variables and interpolate the values $\hat{\phi}(k)$.
2. Complete the remaining complex variables according to the antisymmetry condition, $\hat{\phi}(-k) = \hat{\phi}^*(k)$.
3. Take the inverse Fourier transform to obtain $\phi(r)$.
4. Use a bisection algorithm to search for a value of $\phi_C$ such that, with the level cut condition, the 3D rock representation with the required porosity is obtained. Such bisection methods are well known to those skilled in the art.

In some embodiments of the present invention, utilizing LDF representation reduces both the total dimensionality of the mathematical problem and introduces the possibility utilizing a global optimization strategy to make non-local changes since changes in the Fourier components can globally affect important petrophysical quantities such as pore size and shape. Technical details on Fourier representations can be found in R. Salazar and L. D. Gelb, "A Computational Study of the Reconstruction of Amorphous Mesoporous Materials from Gas Adsorption Isotherms and Structure Factors via Evolutionary Optimization", Langmuir 23, 530 (2007), hereby incorporated by reference in its entirety.

Forward Modeling the Petrophysical Properties.

At operation 18, a plurality of petrophysical properties are simulated or forward modeled on the 3D rock representation to generate predicted petrophysical properties. In some embodiments, the petrohysical properties include but are not limited to: NMR properties, electrical properties, elastic properties, nuclear properties, capillary pressure and permeabilities. As an example, using NMR $T_2$ decay and formation factor as the petrophysical properties to be forward modeled, and a random walk forward modeling technique, the mathematical problem can be related to the diffusion equation and an efficient solution for determining petrophysical responses is obtained. Computational efficiency is necessary in global optimization since tens of thousands of forward calculations are required.

Random walks reproduce the diffusive motion of spins to simulate the NMR response of confined fluids in porous media. This algorithm simulates the projection M(r,t) of spin packets in the transversal plane of the rotation frame, i.e., in the plane of measurement of an NMR tool antenna, and describes the diffusion and the bulk fluid relaxation effects in a uniform external magnetic field as:

$$\frac{\partial M(r,t)}{\partial t} = D_0 \nabla^2 M(r,t) - \frac{M(r,t)}{T_{2b}}$$

where $\nabla^2$ is the Laplacian operator, $D_0$ is the fluid diffusion coefficient and $T_{2b}$ is the transversal fluid relaxation time, mainly due to dipole-dipole interaction between spins within the fluid which locally produces an exponential decay in time. On the 3D lattice represented by the binary rock image, the random walk follows the discrete equation:

$$r(t+\delta t) = r(t) + \delta r \cdot e_i$$

where t is the time, $\delta r$ is the voxel linear size in the image and $e_i$ is a unit vector pointing randomly in one of the 6 Cartesian directions in the lattice: $e_1 = (1,0,0)$ $e_2 = (0,1,0)$ $e_3 = (0,0,1)$ $e_4 = (-1,0,0)$ $e_5 = (0,-1,0)$, $e_6 = (0,0,-1)$. In addition to diffusion, surface relaxation occurs at interfaces between the pore fluids and solid grains. When the walker is located close to the fluid-solid boundary, the magnetization decay is locally enhanced to include this surface relaxation effect at the microscopic level. The probability for the spin to be instantaneously annihilated when it reaches the boundary is calculated by integrating diffusion propagators as:

$$p = \frac{2}{3} \frac{\rho \delta r}{D_0} \times 0.96$$

where $\rho$ is the surface relaxivity. If the walker survives, its position does not change. At each time step, the fraction $n(t)/n(0)$ of the initial random walkers that are still alive are recorded and the total magnetization amplitude as a function of time is then given as $$M(t) = M_0 \frac{n(t)}{n(0)} \exp(-t/T_{2b})$$

Typical values used to simulate or forward model a one-dimensional a Carr-Purcell-Meiboom-Gill (CPMG) pulse sequence measured on a sample core filled with brine are:

$$D_0 = 2500 \; \mu m^2/s, T_{2b} = 3 \; s, \rho = 16 \; \mu m/s.$$

Random walks can be used to simulate the Laplace equation (i.e., the diffusion equation), and within the long time diffusion limit to recover the tortuosity, and therefore the formation factor. The formation factor F is defined as the ratio of the conductivity of the bulk fluid to that of the rock saturated with the fluid. For a tortuous pore network, the formation factor is a function of the tortuosity $\tau = F\phi$ where $\phi$ is the porosity of the rock. Tortuosity refers to the ratio of the diffusion coefficient in free space to that in the porous media. The diffusion coefficient D in the three dimensional space is obtained from the time derivative of the mean-square displacement $$D(t) = \frac{1}{6}\frac{d\langle r^2(t)\rangle}{dt}$$

Where $\langle r^2(t)\rangle$ is the mean-square displacement of the $n_r$ random walkers with positions $r_i(t)$, i=1, ..., $n_r$.

$$\langle r^2(t)\rangle = \frac{1}{n_r}\sum_{i=1}^{n_r}[r_i(t) - r_i(0)]^2$$

The pore structure is assumed to be isotropic. For unrestricted diffusion in bulk fluid, $\langle r^2(t)\rangle = 6D_0 t$, and thus $D(t)=D_0$ is constant. Within a pore structure D(t) is time-dependent and reduced compared to that in the bulk fluid. The limiting value $D_\infty$ at long-time gives the tortuosity $\tau = D_0/D_\infty$. Mirror boundary conditions are used on the finite 3D binary image to allow long-time diffusion dynamics. In summary, using a 3D rock representation as input, the NMR T2 decay and formation factor are calculated using the described forward modeling methods. Although forward modeling using random walks has been described in detail, those skilled in the art will recognize that other forward modeling methods can be used, such as finite differences, finite elements, network modeling, and cellular automata. The forward models applied to the 3D rock representation and considering the pore-scale physics of the subsurface rock and fluids, can be designed in general to simulate other petrophysical properties.

Determining Convergence.

Referring back to FIG. 1, at operation 20 convergence of the predicted and measured petrophysical properties is determined by calculation a $L_2$ norm measure. An inversion or joint-inversion problem can be stated as an optimization, where the function to optimize or minimize is a measure of the difference between the measured data and the model predicted data. An $L_2$ norm is generally used, where the function $\chi^2$ is the least squared function to minimize:

$$\chi^2(x) = \sum_{j=1}^{N_j}[b_j - f_j(x)]^2$$

$\chi^2$ is a function of n parameters $x_i$ that form the representation vector X. $\{b_j, j=1, \ldots, N_j\}$ is the measured petrophysical property to be honored. Convergence is achieved when the change in the minimum $\chi^2$ value is within a determined tolerance. Numerical constraints on the variables can be introduced as additional terms, regularization terms, etc. In most of the cases of interest, f in the previous equation has a nonlinear dependence on the parameters. This prevents the use of general linear algebra methods.

Global Optimization Method.

At operation 22, the variables of the simplified 3D rock representation are modified using a global optimization method and repeating operations 16 to 22 until convergence of the predicted petrophysical properties and the measured petrophysical properties is reached. Nonlinear problems generally have more than one minimum; hence, a local minimization result may not be the global minimum. Even nonlinear methods which use local gradient information, such as those based on the Levenberg-Marquardt algorithm, do not ensure that the found minimum is the global one. In some embodiments, the global optimization method for modifying the variables of the simplified structural representation can include heuristic algorithms such as evolutionary strategies ("ES"), genetic algorithms, simulated annealing, and parallel tempering, or a combination thereof. Global optimization methods must be capable of managing computationally intensive problems with a large number of variables.

In an example, ES operate on a population of trial structures and therefore lends itself well to implementation on parallel computer architecture. Additionally, ES provides global dynamics in which the whole vector x is modified between $\chi^2$ evaluations, which greatly increases efficiency. An initial population of P individuals $\{x_m\}$ is generated randomly. Once generated, this initial population evolves over many generations. ES includes recombination, mutation, and selection of individuals in a population of solutions.

The operation of recombination includes generation of Q>P offspring $\{x_l\}$ from the present population of P parents, using a local discrete recombination algorithm. Two random parents are chosen from the original population. One offspring is then created by choosing one parent randomly for each component onto the offspring. This corresponds to shuffling together the working representations of the parents such that all information at a given component is obtained only from one parent. Note that most prior ES applications have used at least Q/P≈6 in this step.

The operation of mutation includes modification of each offspring in the set $\{x_l\}$ by using a step along a log-normal random walk:

$$\ln x_{l,i} \rightarrow \ln x_{l,i} + G_{l,i}\Delta$$

where $G_{l,i}$ are independent normal Gaussian random numbers. $\Delta$ is a global parameter that controls the size of the moves in the random walk that is slowly reduced to allow fine tuning of optimal structures towards the end of the run. We use $\Delta = \Delta_0 \sqrt{\overline{\chi^2}}$, where $\overline{\chi^2}$ is the average fitness of the current population. This mutation mechanism properly manages all the different orders of magnitude present in $x_{l,i}$. In order to allow changes in sign we also include $x_{l,i} \rightarrow -x_{l,i}$ moves with a low probability $p_f$.

The operation of evaluation and selection includes evaluating the fitness criterion $\chi^2(x_l)$ for each offspring. From the offspring population Q, the P−1 offspring $\{x_m\}$ with the lowest $\chi^2(x_m)$ values survive to become the next generation of parents and the rest are eliminated (survival of the fittest). In addition, the best parent from the previous generation is kept in order to prevent the loss of the current best individual.

Optimized 3D Rock Representation.

Convergence is achieved when the minimum $\chi^2$ value does not change over generations, or changes within a defined tolerance. $\chi^2$ values of $O(10^{-4})$ are typically achieved within a few hundred generations. Evaluation of $\chi^2$ for the Q offspring can be computationally intensive, but can be performed in parallel. An optimized 3D rock representation is generated from the simplified structural representation found at convergence using the forward modeling procedures described herein. The resulting optimized 3D rock representation captures the petrophysical properties, of the subsurface rock structure considered initially. The optimized 3D rock representation can then be used to calculate (simulate) and predict additional petrophysical quantities and reservoir parameters, such as NMR properties, electrical properties, elastic properties, nuclear properties, capillary pressure, permeabilities, facies, and relative permeability, not considered in the inversion, but useful to further characterize the subsurface rock structure.

The implemented joint-inversion method 10 of FIG. 1 minimizes a function $\chi^2$, which measures the fitness of predicted values with respect to measured, or target, values of several petrophysical properties together. The global optimization algorithm used can be based on ES, which mimic the survival of the fittest individuals in populations that evolve from one generation to another following reproduction and mutation rules. In order to enable computation capacity for full searching by the global optimization algorithm, fast forward models, which may utilize random walk methods, can be used to calculate the target measured petrophysical properties. A simplified 3D rock representation of the subsurface rock structure can be obtained by considering a discrete partition of the Fourier space representation for certain directions and certain wavelengths. In this way, a 3D rock representation of the subsurface rock structure, composed of $100^3$ voxels in the real space, can be represented in a simplified 3D rock representation in the Fourier space with approximately 5000 variables.

Results.

In one embodiment, a 3D X-ray microtomographic image at resolution 20 micron/voxel and lattice size of $64^3$ of a sandstone with a 19% porosity and a 250 mD permeability, is initially used as the original 3D rock image. Using method 10, the NMR magnetization time decay and the formation factor are calculated. These two petrophysical properties and the estimated porosity are the input data for the joint-inversion method. As output, a resulting 3D rock representation, which has similar NMR and formation factor properties, is generated. Other petrophysical quantities, such as capillary pressure curve, are calculated from the original 3D rock image and compared with the same petrophysical property calculated from the resulting optimized 3D rock representation in order to test that it contains a statistically similar pore structure as the original image.

Figure 4:
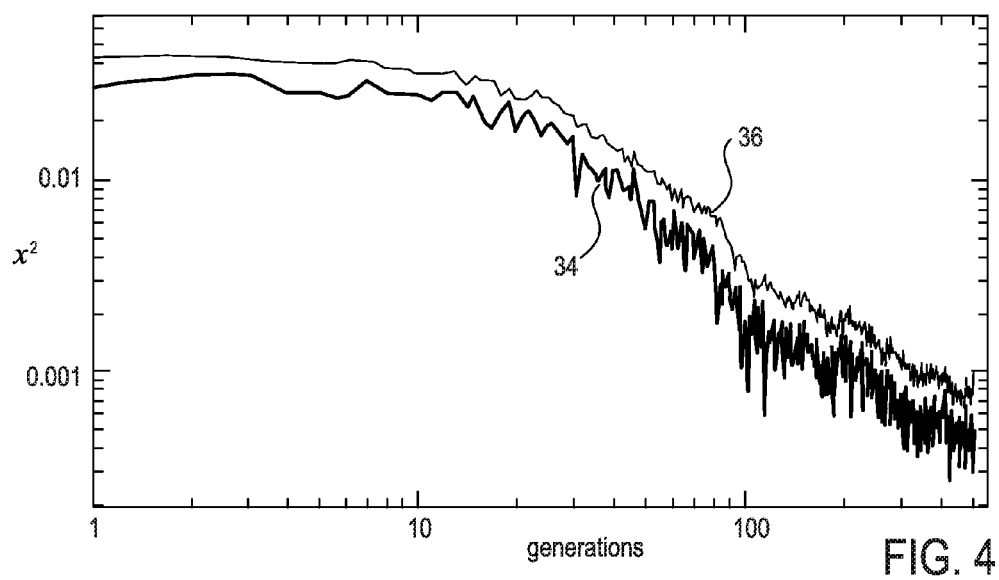
FIG. 4 illustrates the evolution of individuals and generations for one embodiment of the present invention.
Figure 5:
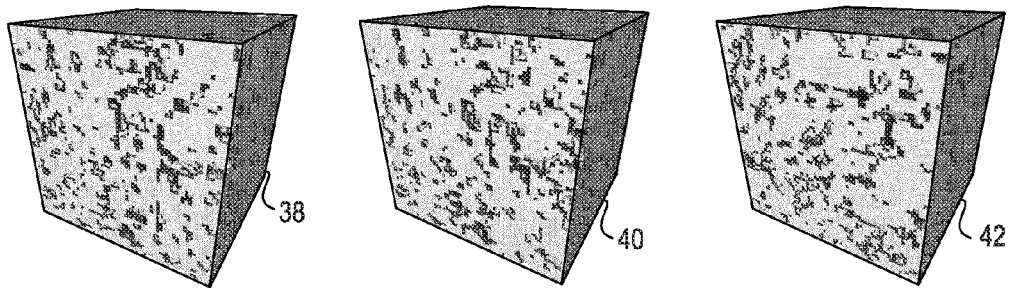
FIG. 5 illustrates 3D representations of the rock structure for one embodiment of the present invention.
Figure 6:
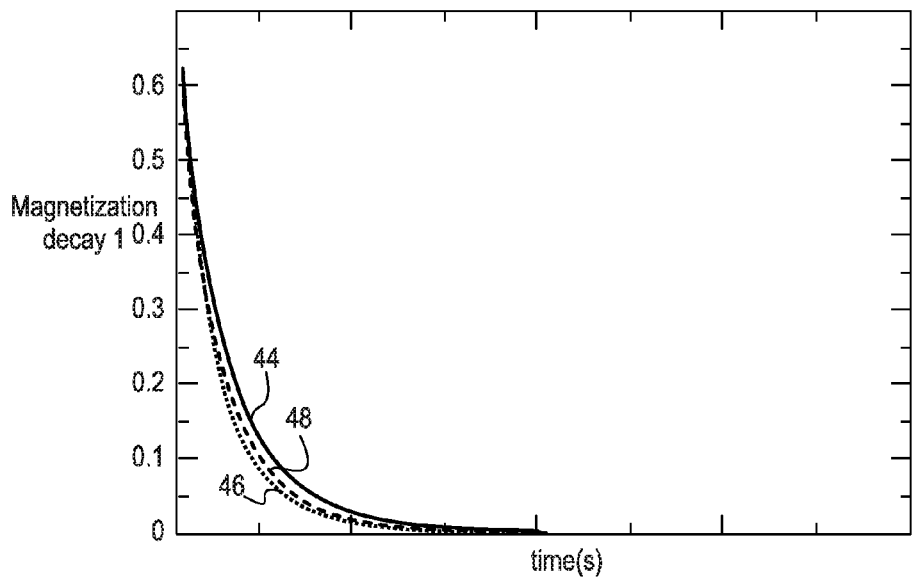
FIG. 6 illustrates the simulated NMR time decay signal for one embodiment of the present invention.
Figure 7:
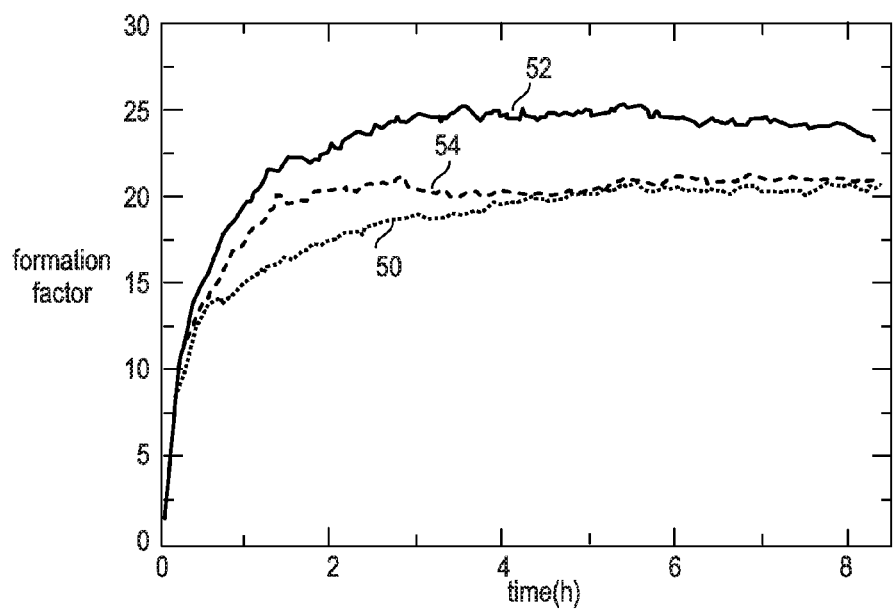
FIG. 7 illustrates the estimated formation factor for one embodiment of the present invention.

The initial population is estimated using a correlation length from the original image. For the reconstruction, NMR magnetization time decay and the formation factor are input together. FIG. 4 shows the evolution of $\chi^2$ as a function of generations. The best individual or minimum 34 per generation and the average individual 36 are plotted. The evolution process refines the simplified 3D rock representation while trying to minimize $\chi^2$. Small changes in the structure occur at late stages of the optimization, as shown in FIG. 5. FIG. 5 shows the best individual 3D rock representation at generation #50 38, and #500 40. The original target image is shown as 42. The evolution of the petrophysical properties are monitored for the best individual. FIG. 6 shows the NMR signature approaching the target data with increasing number of generations; target is shown as 46, at generation #50 shown as 44, and at generation #500 shown as 48. The long-time diffusion limit which gives the formation factor is shown in FIG. 7. The formation factor used to compare with the target value is the average of the second half simulation time interval. FIG. 7 presents the comparison between the best individual curve at two stages of the optimization over generations and the curve calculated from the target image. The target image is shown as 50, the best individual at generation #50 is shown as 52, and at generation #500 as 54.

To determine if the results comprise a representative structure with petrophysical properties similar to the target structure, the quality of different petrophysical properties not included in the optimization process are compared. For example, the capillary pressure curve is simulated using any number of algorithms known in the art and the linear path function which is related to the gas permeability. The results obtained for the simulated capillary pressure are presented in FIG. 8: the target image is shown as 56, the best individual at generations #50 is shown as 58 and at generation #500 as 60.

Figure 9:
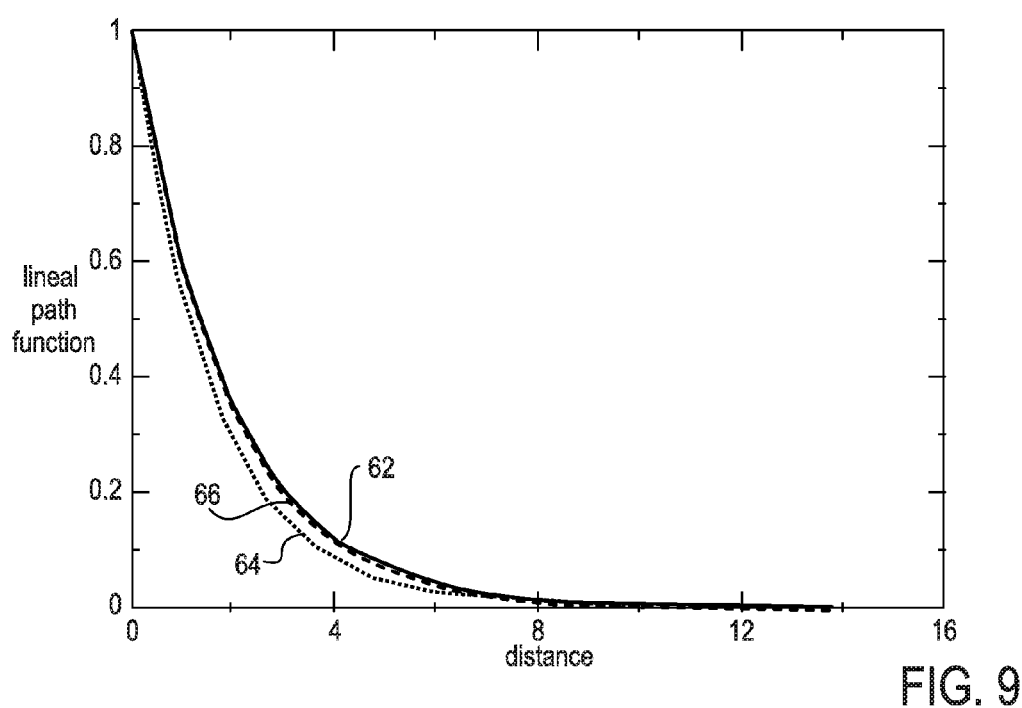
FIG. 9 illustrates the calculated linear path function for one embodiment of the present invention.

The linear path function is defined as the probability that a line segment of a certain length lies entirely in a single phase (pore phase in order to relate with gas permeability) when randomly thrown into the sample. The results obtained are shown in FIG. 9. FIG. 9 shows the linear path function calculated on the target image shown as 62, the best individual at generation #50 is shown as 64, and at generation #500 as 66.

Figure 8:
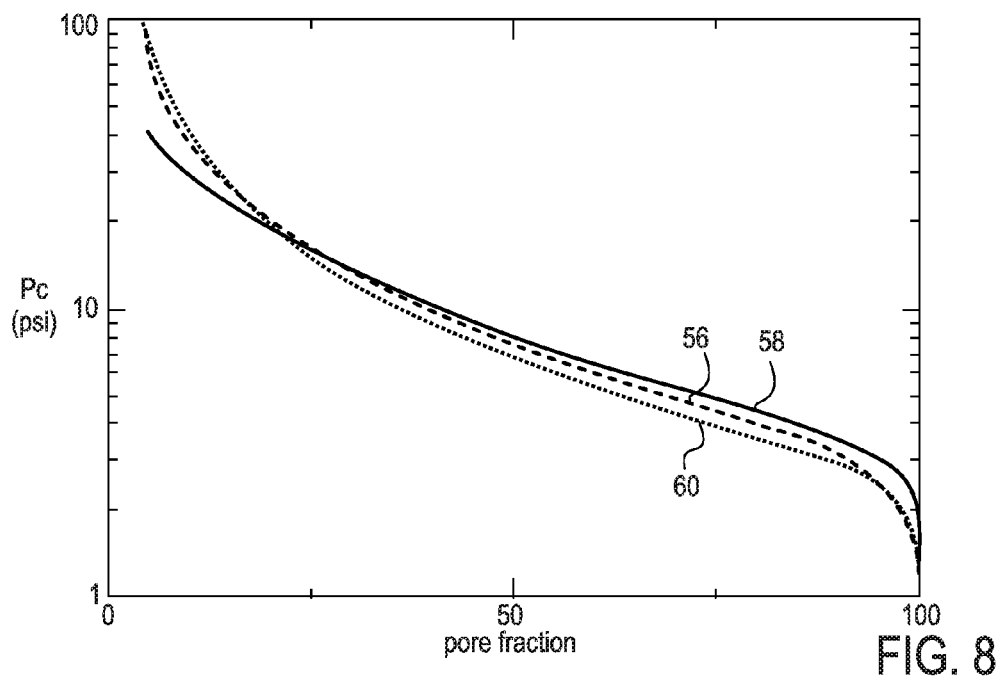
FIG. 8 illustrates the estimated capillary pressure for one embodiment of the present invention.

The results displayed in FIGS. 8 and 9 show an improvement on the predicted capillary pressure curve and linear path function with increasing number of generations despite the fact these properties were not considered target properties in the optimization process. Such results demonstrate that utilizing appropriate petrophysical properties, in this example NMR and formation factor, the resulting 3D rock representation can be used to predict other properties, not used during its construction.

Figure 10:
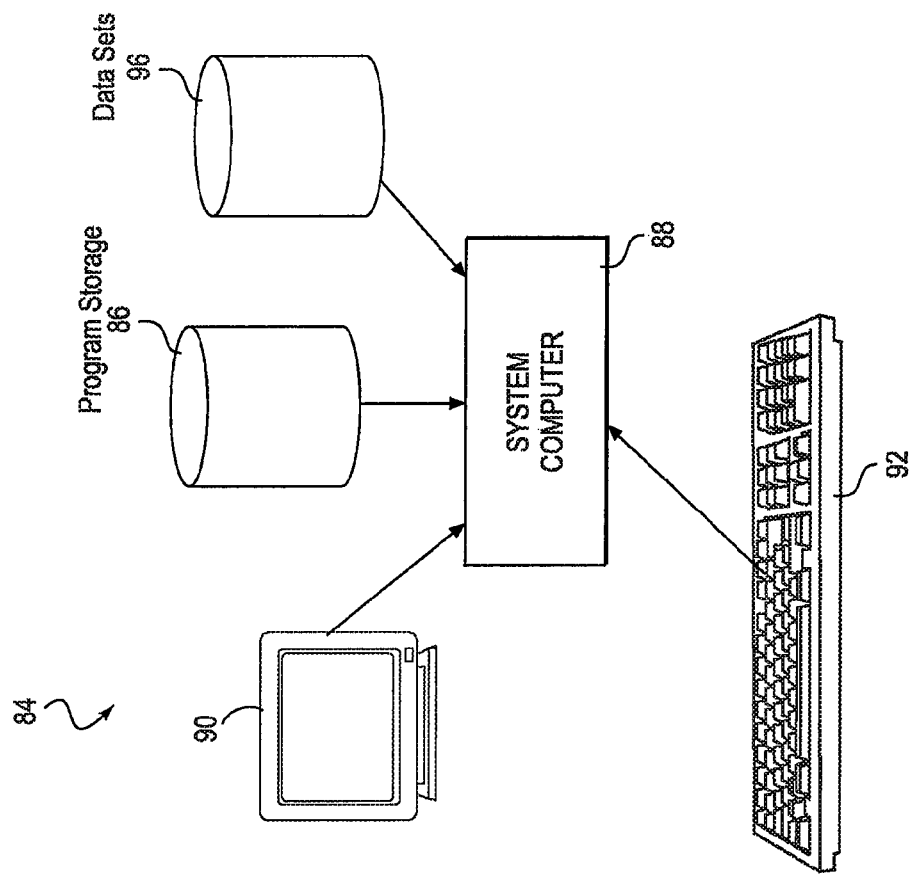
FIG. 10 schematically illustrates an example of a computer system for performing the present invention.

FIG. 10 schematically illustrates an example of a computer network 84, into which implementations of various technologies described herein may be implemented. The computer network 84 may include a data processing system or computer system 88, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, Linux computers, mainframe computers, and the like.

The computer system 88, comprising at least one processor, may be in communication with at least one disk storage or at least one memory device 86 and 96, which may be external hard disk storage devices. It is contemplated that disk storage devices 86 and 96 are conventional hard disk drives, and as such, will be implemented by way of a local area network or by remote access. Of course, while disk storage devices 86 and 96 are illustrated as separate devices, a single disk storage device may be used to store any and all of the program instructions, measurement data, and results as desired.

In one implementation, data sets related to the subsurface rock structure may be stored as computer storage media in disk storage device 96. The computer system 88 may retrieve the appropriate data from the disk storage device 96 to process the data according to program instructions that correspond to implementations of various technologies described herein. The program instructions may be written in a computer programming language, such as FORTRAN, C, C++, Java and the like. The program instructions may be stored in a computer-readable medium, such as a program disk storage device 86. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 88. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the computer system 88 may include at least one graphical user interface (GUI) components such as a graphics display 90 and a keyboard 92 which can include a pointing device (e.g., a mouse, trackball, or the like, not shown) to enable interactive operation. The GUI components may be used both to display data and processed data products and to allow the user to select among options for implementing aspects of the method. The computer system 88 may store the results of the methods described above on disk storage 86, for later use and further analysis.

The computer system 88 may be located at a data center remote from the data acquisition region or processing facility (not shown). The computer system 88 may be in communication with the data acquisition receivers (either directly or via a recording unit, not shown), to receive signals indicative of the petrophysical properties of the subsurface rock structure. These signals, after conventional formatting and other initial processing may be stored by the computer system 88 as digital data in the disk storage 96 for subsequent retrieval and processing in the manner described above. While FIG. 10 illustrates the disk storage 96 as directly connected to the computer system 88, it is also contemplated that the disk storage device 96 may be accessible through a local area network or by remote access. Furthermore, while disk storage devices 86 and 96 are illustrated as separate devices for storing input data and analysis results, the disk storage devices 86 and 96 may be implemented within a single disk drive (either together with or separately), or in any other conventional manner as will be fully understood by one of skill in the art having reference to this specification.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. All patents and publications referenced herein are hereby incorporated by reference to the extent not inconsistent herewith.

What is claimed is:

1. A computer implemented joint-inversion method for creating a 3D rock representation of a subsurface rock structure using petrophysical data, the method comprising:
  a) storing a plurality of acquired data sets related to a subsurface rock structure, wherein the datasets comprise measured petrophysical properties of the subsurface rock structure, in at least one computer storage media;
  b) executing, on a computer system comprising one or more processors configured to communicate with the computer storage media and execute one or more computer programs configured to generate a simplified 3D rock representation of the subsurface rock structure with a reduced number of variables, wherein the variables represent an approximation to the subsurface rock structure, wherein the simplified 3D rock representation of the subsurface rock structure is an approximation of the subsurface rock structure generated using one or more of a discrete Fourier filtered representation, a wavelet filtered representation, or a transition probability matrix with spatial correlations;
  c) generating, by the computer system, a 3D rock representation from the simplified 3D rock representation;
  d) forward modeling, by the computer system, a plurality of petrophysical properties on the 3D rock representation to generate predicted petrophysical properties;
  e) comparing, by the computer system, the predicted petrophysical properties and the measured petrophysical properties;
  f) modifying, by the computer system, the variables of the simplified 3D rock representation using a global optimization method and repeating operations c) to f) until convergence of the predicted petrophysical properties and the measured petrophysical properties is reached; and
  g) generating, by the computer system, an optimized 3D structural representation from the simplified 3D rock representation found at convergence;
  wherein the optimized 3D structural representation has the petrophysical properties of the subsurface rock structure and can be used to simulate additional petrophysical, geology and reservoir properties.

2. The method of claim 1 wherein the data sets include core data and log data.

3. The method of claim 1 wherein the petrophysical properties include rock and fluid properties, including: NMR properties, electrical properties, elastic properties, nuclear properties, capillary pressure and permeabilities.

4. The method of claim 1 wherein the forward modeling method comprises joint-inversion of any combination of NMR response, electric properties, elastic response, nuclear properties, capillary pressure, formation factor, and permeabilities.

5. The method of claim 1 wherein the forward modeling method comprises nonlinear joint-inversion.

6. The method of claim 1 wherein the forward modeling method comprises one or more of random walks, finite differences, finite elements, network modeling, and cellular automata.

7. The method of claim 1 wherein convergence is determined when a difference between the measured petrophysical properties and the predicted petrophysical properties are minimized in accordance with the following equation:

$$\chi^2(x) = \sum_{j=1}^{N_j} [b_j - f_j(x)]^2$$

where:
$\chi^2$ is a function of n parameters x, that form the representation vector $\chi$; and $\{b_j, \ldots, N_j\}$ are the measured petrophysical properties.

8. The method of claim 1 wherein modifying the variables of the simplified 3D rock representation utilizes a global optimization method which comprise one or more of evolutionary strategies, genetic algorithms, simulated annealing, and parallel tempering.

9. The method of claim 7 wherein modifying the variables of the simplified 3D rock representation utilizes a global optimization method which comprises evolutionary strategies, wherein the evolutionary strategies include recombination, mutation, and selection of individuals in a population of solutions.

10. The method of claim 1 wherein the optimized 3D rock representation is used to predict additional petrophysical, geological and reservoir properties, including: NMR properties, electrical properties, elastic properties, nuclear properties, capillary pressure and permeabilities, facies, and relative permeability.

11. The method of claim 1 wherein the optimized 3D structural representation is graphically displayed.

12. A computer system configured to perform joint-inversion of petrophysical data sets to obtain a 3D rock representation of a subsurface rock structure, the system comprising:
   a) a computer storage device having computer readable media including a plurality of data sets related to a subsurface rock structure, wherein the datasets comprise measured petrophysical properties of a subsurface rock structure;
   b) a graphical user interface comprising a user input device and a display device, configured and arranged to display at least one image of an optimized 3D rock representation; and
   c) at least one processor, configured and arranged to execute computer-readable executable instructions stored in computer storage media to perform a method comprising:
      i) generating a simplified 3D rock representation of the subsurface rock structure with a reduced number of variables, wherein the variables represent an approximation to the rock structure, wherein the simplified 3D rock representation of the subsurface rock structure is an approximation of the subsurface rock structure generated using one or more of a discrete Fourier filtered representation, a wavelet filtered representation, or a transition probability matrix with spatial correlations;
      ii) generating a 3D rock representation from the simplified rock representation;
      iii) forward modeling a plurality of petrophysical properties on the 3D rock representation to generate predicted petrophysical properties;
      iv) comparing the predicted petrophysical properties to the measured petrophysical properties;
      v) modifying the variables of the simplified 3D rock representation using a global optimization method and repeating operations ii) to v) until convergence of the predicted petrophysical properties and the measured petrophysical properties is reached; and
      vi) generating an optimized 3D rock representation from the simplified 3D rock representation found at convergence; wherein the optimized 3D rock representation has the petrophysical properties of the subsurface rock structure and can be used to determine additional characteristics of the subsurface rock structure.

* * * * *